United States Patent [19]
Viegener

[11] Patent Number: 5,906,401
[45] Date of Patent: May 25, 1999

[54] CLAMP ASSEMBLY FOR FASTENING CONNECTIONS OF TAPS ONTO A DEVICE WALL

[76] Inventor: Francisco Enrique Viegener, 1053 Bernardo de Irigoyen Street, 1602 Florida—Buenos Aires State, Argentina

[21] Appl. No.: 09/104,213

[22] Filed: Jun. 25, 1998

[30] Foreign Application Priority Data

Jun. 26, 1997 [AR] Argentina .......................... 97 01 02818

[51] Int. Cl.⁶ .............................. F16J 15/00; F16L 55/00; F16B 37/08
[52] U.S. Cl. .............................. 285/90; 285/92; 411/230; 411/275; 411/433
[58] Field of Search .................... 411/230, 274, 411/275, 433, 936; 285/90, 92

[56] References Cited

U.S. PATENT DOCUMENTS

| | | | |
|---|---|---|---|
| 1,850,917 | 3/1932 | Browne | 411/230 |
| 1,876,487 | 9/1932 | Chanaberry | 285/90 |
| 2,409,204 | 10/1946 | Gall | 411/291 X |
| 2,781,686 | 2/1957 | Boyd | 411/936 X |
| 3,176,745 | 4/1965 | NyGorg | 411/275 |

*Primary Examiner*—Neill Wilson
*Attorney, Agent, or Firm*—Kilpatrick Stockton LLP

[57] ABSTRACT

A clamp assembly for firmly connecting a tap in a sanitary or kitchen appliance without consuming a large space, the assembly comprising a compact clamp and a short screw, the clamp having a large orifice to be passed along a pipe portion of the tap and a small orifice receiving the screw, the clamp operating like a lever around the pipe portion of the tap and being retained against an outer surface of the pipe portion by screwing the screw in the small orifice and making a distal tip of the screw engaging a wall of the device so as to cause the clamp move like a lever and make the large orifice to wedge against the pipe portion of the tap.

7 Claims, 2 Drawing Sheets

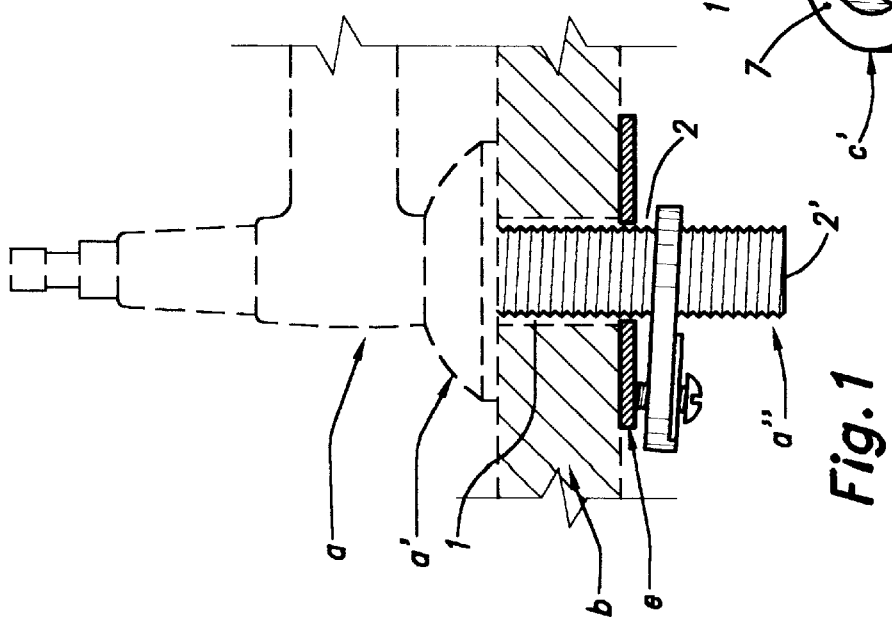
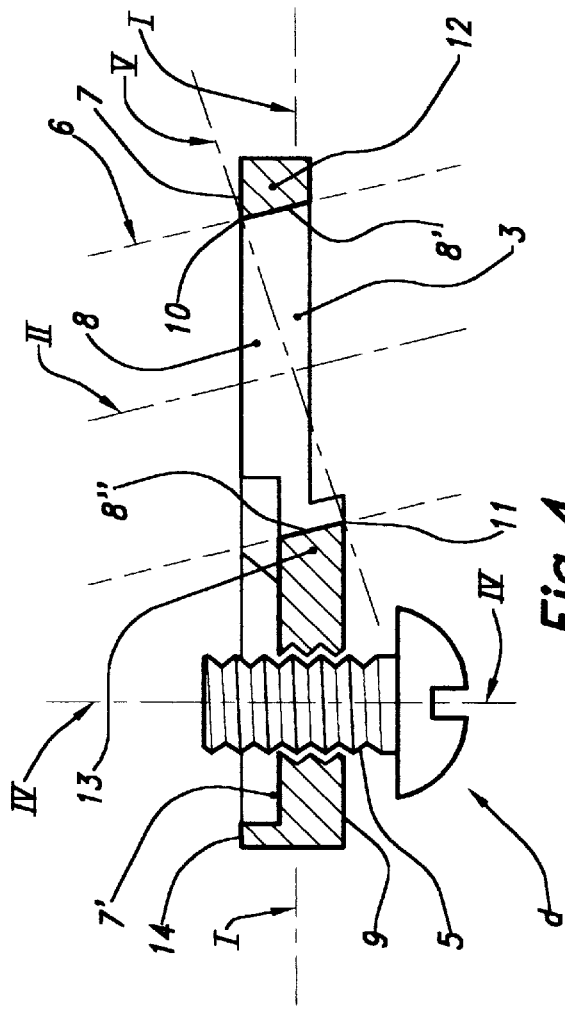
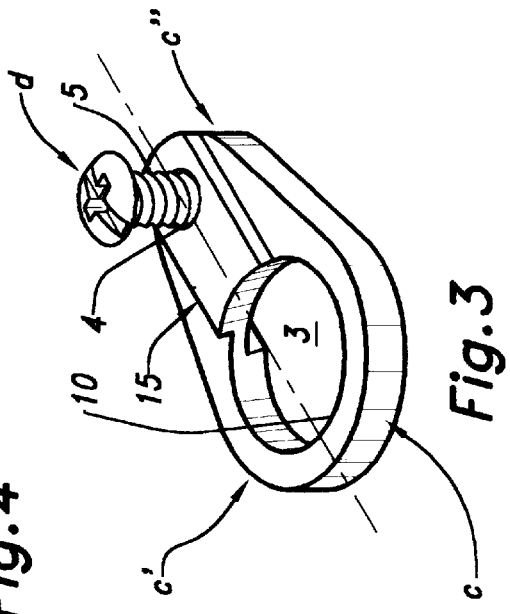
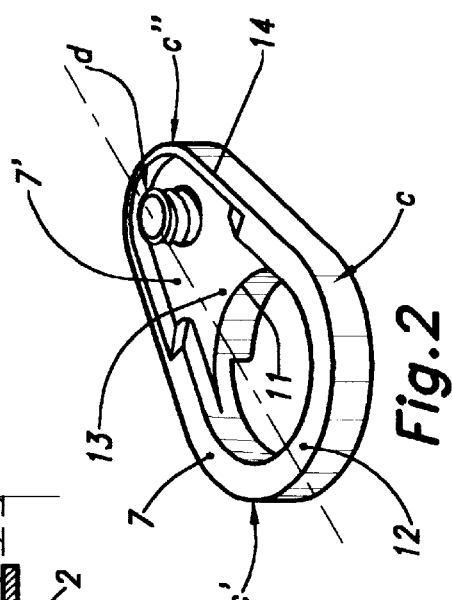

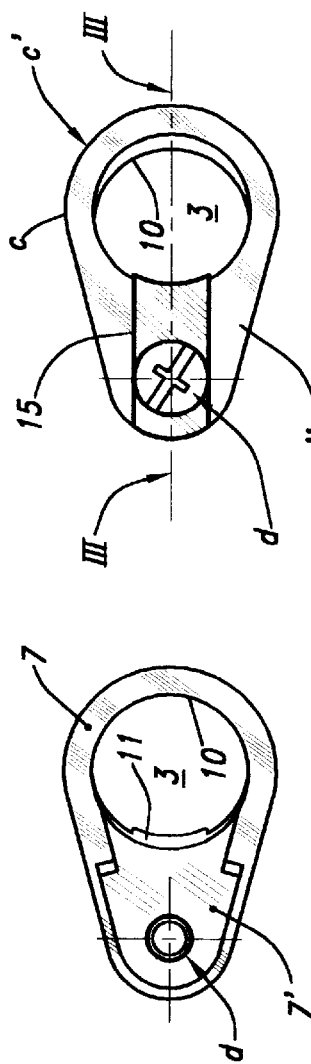
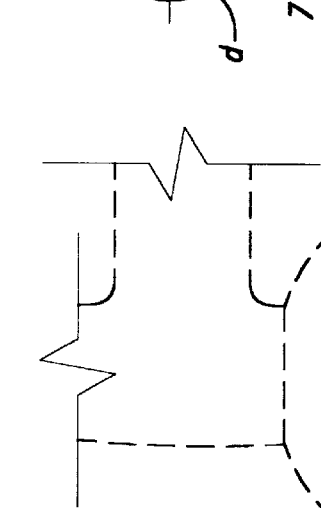
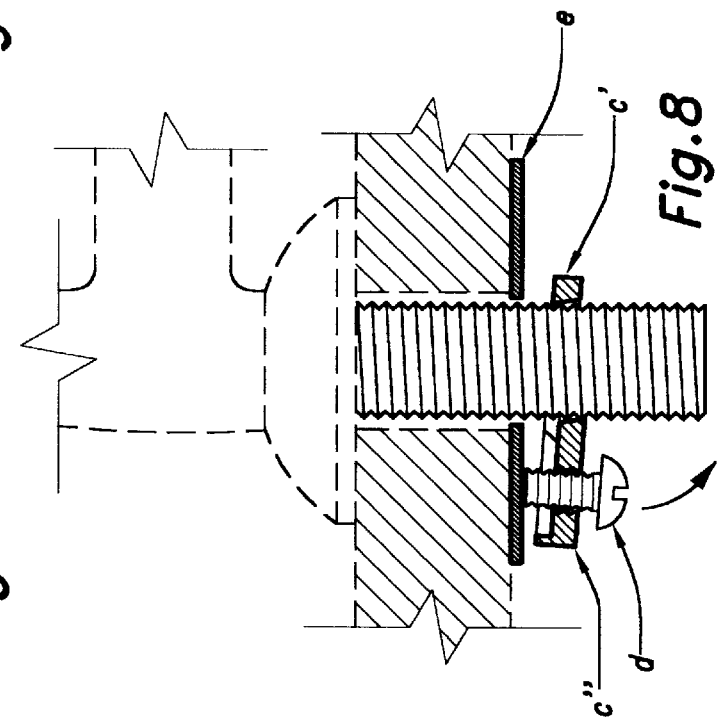
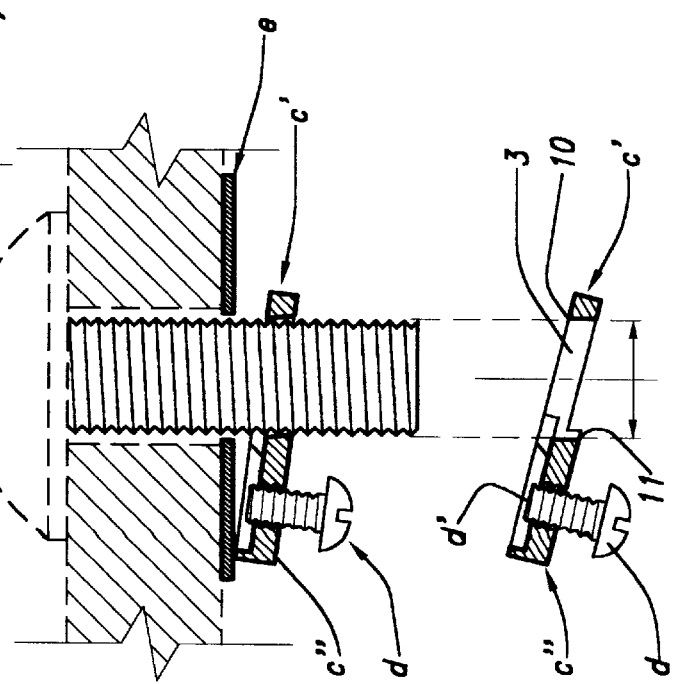

CLAMP ASSEMBLY FOR FASTENING CONNECTIONS OF TAPS ONTO A DEVICE WALL

BACKGROUND OF THE INVENTION

1. Field of the Invention

The present invention relates to the field of sanitary devices or appliances such as toilettes, sinks, bathtubs, bidets and the like, wherein taps, faucets, valves, and other water or liquid supplying devices are connected, which devices must be firmly retained in at least a wall of the corresponding device to facilitate the connection of the device to the water carrying pipeline of the water home or public installation.

To the purpose of the present specification the term device wall must be understood as comprising any surface and/or wall of a device preferably comprising a public or home sanitary device such a sink, bidets, tubs, or kitchen counters and the taps comprise any kind of valve devices or faucets that have a tube portion passing through the cited device wall and being connected to the water or other fluid carrying pipeline.

2. Description of the Prior Art

It is well known to provide a firm connection between the set of taps provided in any sanitary device or kitchen counter wherein the taps include a pipe portion extending through a wall of the device, with the pipe or conduit portion being provided with threads on the outer surface thereof for a nut to be threaded in the pipe threads to retain the tap against the device wall. The installation of the nut, and particularly the insertion of a tool for rotating the nut is not always possible in the very small room available under sinks, bathtubs and bidets. This situation makes the nuts to be rotated by hand and then adjusted, as much as possible, by any kind of a small tool which causes the nut to be not always well adjusted.

To overcome the above problem a clamp for retaining the tap against the device wall have been devised by the inventor of the present application and disclosed in the Argentine Pat. No. 235827. This patent discloses a clamp comprising a slight V-shaped plate with two portions angularly arranged, one portion including a large orifice for passing the conduit portion of the tap therethrough and the other portion having a small orifice with a screw passing therethrough. The large orifice is capable of clamping against the threaded portion of the tap upon tilting of the clamp by rotating the screw inserted in the small orifice and making the screw to engage the device wall to as to move the clamp with a lever movement around the pipe portion of the tap. With this movement, the large orifice is wedged against the pipe portion and the pipe portion is pulled out of the device wall so as to fix the tap against the device. This clamp, however, occupies a large space and it becomes an obstacle for the further connection of the pipe portion to the water supplying pipeline. Some times, when connecting the water pipeline, the clamp is inadvertently knocked and the retention is released.

In addition, the large and clamping orifice of the patented clamp hardly remained retained against the pipe portion because the retention, gripping or grasping effect between the inner edges of the orifice and the outer surface of the pipe portion is not enough for a well retention and no means are provided for enhancing this retention.

It would be therefore convenient to have a clamp for replacing the nut-threaded pipe retention but without the drawbacks of space consuming like with the clamp disclosed in the prior patent of the same inventor.

3. SUMMARY OF THE INVENTION

It is therefore an object of the present invention to provide a compact clamp assembly for retaining a tap, such as a faucet, in a device such as a sink, bathtub, bidet and any other sanitary or kitchen appliance, wherein the clamp is arranged very close to a mounting wall of the appliance without forming an obstacle for a further installation and connection of the fluid carrying pipeline to the appliance.

It is still another object of the present invention to provide a clamp assembly for firmly connecting a tap in a sanitary or kitchen appliance without consuming a large space, the assembly comprising a compact clamp and a short screw, the clamp having a large orifice to be passed along a pipe portion of the tap and a small orifice receiving the screw, the clamp operating like a lever around the pipe portion of the tap and being retained against an outer surface of the pipe portion by screwing the screw in the small orifice and making a distal tip of the screw engaging a wall of the device so as to cause the clamp move like a lever and make the large orifice to wedge against the pipe portion of the tap.

It is a further object of the present invention to provide a clamp assembly for firmly retaining a connection of a tap in a device wall, the tap including an operating portion remaining at an outer side of the device wall and a conduit portion extending through an orifice in the device wall and remaining at an inner side of the device wall, the clamp assembly comprising:

an integrally formed clamp body including a first clamping orifice for passing along said conduit portion of the tap and a second threaded orifice having a geometrical axis normal to a main plain of the clamp body, a screw being threadably connected into said second orifice of the clamp body, the first orifice having two diametrically opposite inner sections aligned along a longitudinal geometrical axis of the clamp body, these sections defining together an oblique cylinder defining a geometrical axis oblique to said main plane of the clamp body, converging to the geometrical axis of the second orifice, towards the device wall, the clamp body defining a distal side facing said device wall and a proximal side looking far away of said device wall, the opposite clamping sections of the second orifice forming diametrically opposed clamping acute-angled edges each located at opposite sides of the main plane of the clamp body, whereby the first orifice of the clamp body may be inserted over said conduit portion and, when the clamp body is close to the device wall, the screw is threaded into the second orifice until a tip of the screw engages the device wall and moves the clamp body as a lever and causes the clamp body to incline, thus making the clamping edges to fix, by wedging, against the conduit portion of the tap.

The above and other objects, features and advantages of this invention will be better understood when taken in connection with the accompanying drawings and description.

BRIEF DESCRIPTION OF THE DRAWINGS

The present invention is illustrated by way of example in the following drawings wherein:

FIG. 1 shows a cross-sectional and side elevation view of a clamp assembly according to the invention mounted in a conduit on pipe portion of a tap illustrated in phantom lines;

FIG. 2 shows a perspective view taken from the distal side of the clamp assembly shown in FIG. 1;

FIG. 3 shows a perspective view taken from the proximal side of the clamp assembly shown in FIG. 1;

FIG. 4 shows a longitudinal cross-sectional view of the clamp assembly of FIGS. 1–3;

FIG. 5 shows a plant view taken from the distal side of the clamp assembly of the invention;

FIG. 6 shows a plant view taken from the proximal side of the clamp assembly of the invention;

FIG. 7 shows a cross-sectional and side elevation view similar to FIG. 1, illustrating the clamp assembly both installed onto the pipe portion of the tap and ready before being installed in the pipe portion of the tap, the projection of the pipe portion being illustrated in phantom lines; and FIG. 8 shows a cross-sectional and side elevation view similar to FIG. 7, illustrating the clamp assembly installed onto the pipe portion of the tap.

DESCRIPTION OF THE PREFERRED EMBODIMENTS

Now referring in detail to the drawings it may be seen from FIG. 1 that a tap, preferably a faucet a having a mounting base a', is installed in a wall b of a sanitary or kitchen device or appliance, such as a bath sink, bathtub, bidet, kitchen sink or kitchen counter. Tap a includes an operating portion (the part shown in phantom lines in FIG. 1) and a pipe or conduit portion a" passing through an orifice 1 in the device wall b, and having a portion 2 for fixing the clamp assembly of the invention and a bottom end 2' to be connected to the water or other fluid supplying pipeline.

Clamp assembly c according to the invention may be easily installed in portion a" to remain close to device wall b, preferably against a washer e, so as to be firmly fixed or clamped on portion a" and to exert a pulling force on the conduit portion to retain tap a in wall b. Clamp assembly c comprises a clamp body, preferably a unitary piece made of metal, with a leading end portion c' and a rear end portion c" and with a distal side looking towards wall b and a proximal side looking far away of this wall. Portion c' provides a washer-like portion with a first large clamping orifice 3 adapted for passing over pipe portion a" and being clamped on the outer surface of this conduit portion. Portion c" is a smaller portion including a second smaller threaded orifice 4 through which a fastening screw d having a threaded stem 5 passes to adjust and fix the clamp against wall b as it will be explained later.

Orifice 3, as it is clearly better illustrated in FIG. 4, is defined by a drilled bore the projection of which is indicated by phantom lines 6, which bore defines, at least partially, a geometrical axis II obliquely extended relative to a main plane I-I of the clamp. Axis II is contained within a vertical symmetry plane III-III depicted in FIG. 6 and containing in turn a geometrical axis IV-IV of orifice 4 and screw d, axis II converging towards wall b to intersect axis IV-IV of screw d at a side of plane I-I corresponding to the distal side of the clamp, indicated as an upper surface 7 in FIGS. 2, 4 and 5. The proximal side of the clamp body corresponds to a bottom surface 9 indicated in FIG. 4.

As indicated by inclined axis II, bore 3 defines an inner surface 8 which is biased in at least two diametrically opposite sections or surfaces 8' and 8", these inner sections being aligned along longitudinal geometrical axis I-I of the clamp body, and defining together an oblique cylinder the traces of which, as explained above, may be represented by phantom lines 6. The clamp body around sections 8', 8" has a uniform thickness, particularly at the regions indicated by numeral references 13 and 12. The intersections between inner surface 8 and upper and bottom surfaces 7, 9, at sections 8', 8", define respective clamping edges 10, 11 defining an inclined clamping plane V-V, the clamping edges being located at opposite sides of plane I-I and located symmetrically from main plane I-I. Edges 10, 11 define respective acute angles which are sharp enough to enhance the clamping effect when are clamped against pipe portion a", in other words, to operate like nails or wedges capable of being firmly retained against the pipe portion by grasping and/or clamping, and pulling from the pipe portion to retain the tap in wall b. The thickness 12 and 13 provided in the clamp body enables the clamp to be easily guided along pipe portion a" when is passed over this portion during installation of the clamp assembly. It may be said that edges 10, 11 operate like teeth to bite and grip the conduit portion of the tap.

When installing a set of taps in a sanitary or kitchen appliance, a corresponding wall of the appliance is provided with respective orifices for mounting each of the taps, faucets, etc. When a tap, for example faucet a is located in orifice 1, as illustrated in FIG. 1, clamp c provided with screw d at least partially inserted into orifice 4 is mounted in pipe portion a" by locating orifice 3 axially around the pipe portion and sliding the clamp over this portion until portion c" engages wall b. At this moment portion c' should be pushed up so as to bring this portion as close as possible to wall b and achieve a soft or slight clamping effect of edges 10, 11 against portion a". Preferably, edges 10, 11 will be seated into respective threads of the conduit portion. To bring clamp c even very closed to wall b, the clamp may be rotated by hand around a longitudinal axis (not shown) of conduit portion a" as if the clamp was a nut threaded on the conduit portion. Under these conditions, with or without rotation of the clamp around conduit portion a", the faucet or all the set of faucets, may be preadjusted in position to be then firmly fastened by screwing screw d until a distal tip d', engages wall b. The screw is further rotated, by means of a screwdriver (not shown) for example, so as to make the clamp body tilt in an anti-clockwise direction, as indicated by the arrow in FIG. 8, around conduit portion a", causing the clamp to operate like a lever. Because of this lever-like movement, edges 10, 11 are clamped or gripped against portion a", preferably in the threads provided in this portion. As the screw is further rotated, portion a" is pulled down, as seen in the figure, so as to fix and retain tap a against wall b. The thickness and design of the clamp body, particularly in 12, 13, at sections 8', 8", guarantee a firm and safe gripping and retention of the clamp against portion a". Also, as a result of the novel design of clamp body c, particularly at the orifice 3, the clamp assembly will remain very close to wall b without representing an obstacle to disturb the connection of the water supplying pipelines which must be connected to the corresponding appliance.

To improve even more the design for safety and economy purposes, the proximal and distal sides, or bottom 9 and upper 7 surfaces of the clamp body, are parallel to each other, the distal side being provided with a recess 7' at upper side or face 7 of the body, the recess being surrounded by a peripheral rib 14 to reinforce the clamp. In addition, the proximal side includes a stepped portion 15 projecting from the bottom surface 9 and said stepped portion defines, with a corresponding one 8" of the inner clamping sections of first orifice 3, one edge 11 of the clamping edges 10, 11. The general configuration of the clamp body is elongated and flat, preferably made of metal with rounded ends c' and c".

While preferred embodiments of the present invention have been illustrated and described, it will be obvious to those skilled in the art that various changes and modifications may be made therein without departing from the scope of the invention as defined in the appended claims.

We claim:

1. A clamp assembly for firmly retaining a connection of a tap in a device wall, the tap including a an operating portion remaining at an outer side of the device wall and a conduit portion extending through an orifice in the device wall and remaining at an inner side of the device wall, the clamp assembly comprising:

an integrally formed clamp body including a first clamping orifice for passing along said conduit portion of the tap and a second threaded orifice having a geometrical axis normal to a main plain of the clamp body, a screw being threadably connected into said second orifice of the clamp body, the first orifice having two diametrically opposite inner sections aligned along a longitudinal geometrical axis of the clamp body, these sections defining together an oblique cylinder defining a geometrical axis oblique to said main plane of the clamp body, converging to the geometrical axis of the second orifice, towards the device wall, the clamp body defining a distal side facing said device wall and a proximal side looking far away of said device wall, the opposite clamping sections of the second orifice forming diametrically opposed clamping acute-angled edges each located at opposite sides of the main plane of the clamp body, whereby the first orifice of the clamp body may be inserted over said conduit portion and, when the clamp body is close to the device wall, the screw is threaded into the second orifice until a tip of the screw engages the device wall and moves the clamp body as a lever and causes the clamp body to tilt, thus making the clamping edges fix, by wedging, against the conduit portion of the tap.

2. The clamp assembly of claim 1, wherein said conduit portion is externally threaded and the clamping edges are clamped against the threads of the conduit portion to firmly retain the tap in the wall device.

3. The clamp assembly of claim 1, wherein said clamping edges are located at opposite sides of the main plane of the clamp body and symmetrically spaced from this main plane.

4. The clamp assembly of claim 1, wherein said clamping edges define a clamping plane extending obliquely to the main plane of the clamp body.

5. The clamp assembly of claim 1, wherein said proximal and distal sides are parallel to each other, said proximal side including a stepped portion projecting from the corresponding side while the distal side includes, at a region where the second orifice is arranged, a recess surrounded by a peripheral rib.

6. The clamp assembly of claim 5, wherein said stepped portion defines, with a corresponding one of the inner clamping sections of said first orifice, one of the clamping edges.

7. The clamp assembly of claim 1, wherein the clamp body is an elongated flat metal body with rounded ends.

* * * * *